United States Patent [19]

Callaghan et al.

[11] Patent Number: 4,564,665
[45] Date of Patent: Jan. 14, 1986

[54] OIL GAS SEPARATION

[75] Inventors: Ian C. Callaghan, Wokingham, England; Hans-Ferdi Fink, Essen, Fed. Rep. of Germany; Clive M. Gould, Staines, England; Götz Koerner, Essen, Fed. Rep. of Germany; Hans-Jürgen Patzke, Gelsenkirchen-Resse, Fed. Rep. of Germany; Christian Weitemeyer, Essen, Fed. Rep. of Germany

[73] Assignee: The British Petroleum Company p.l.c., London, England

[21] Appl. No.: 482,202

[22] Filed: Apr. 5, 1983

[30] Foreign Application Priority Data

Apr. 7, 1982 [GB] United Kingdom ............... 8210320

[51] Int. Cl.$^4$ .................................................. C08G 77/06
[52] U.S. Cl. ......................................... 528/21; 528/23; 528/37; 252/328
[58] Field of Search ............................. 528/21, 23, 37; 252/328

[56] References Cited

U.S. PATENT DOCUMENTS 3,660,305  5/1972  Michalski ........................... 252/321
4,122,247 10/1978  Evans .................................. 524/14
4,329,528  5/1982  Evans .................................. 585/3
4,406,817  9/1983  Müller et al. ....................... 252/348

FOREIGN PATENT DOCUMENTS 0032538  7/1981  European Pat. Off. .
0046695  3/1982  European Pat. Off. .
0062748 10/1982  European Pat. Off. .
1159987  4/1970  Fed. Rep. of Germany .
2721238 11/1977  Fed. Rep. of Germany .
1051687 12/1966  United Kingdom .
1572371  6/1980  United Kingdom .

Primary Examiner—Melvyn I. Marquis
Attorney, Agent, or Firm—Morgan, Finnegan, Pine, Foley & Lee

[57] ABSTRACT

Polysiloxanes of specified molecular weight and molecular weight distribution are effective anti-foam agents for reducing foaming in crude oil/gas separators. They are particularly useful in breaking microgas dispersions.

The polysiloxanes, preferably polydimethyl siloxane, contain not more than 10% by weight of components of molecular weight 50,000 and lower, at least 15% by weight of components of molecular weight 200,000 and higher and not more than 6% by weight of components of molecular weight 370,000 and higher, molecular weights being expressed as polystyrene equivalent molecular weights.

4 Claims, No Drawings

OIL GAS SEPARATION

This invention relates to an anti-foam additive, to a method for separating associated gas from crude oil involving the use of the additive and to a stabilised composition containing the same.

When oil is produced from a well, it is forced from the reservoir by pressure up the well to the surface. As the oil rises the pressure becomes less and gas associated with the oil is progressively released from solution.

After emerging from the well, it is usually necessary to treat the mixture of liquid oil and gas to remove free gas and also dissolved gas which is likely to come out of solution when the oil is maintained at about atmospheric pressure, for example, during transport in a tanker.

Sometimes the separation is effected near the wellhead or, alternatively, the oil and gas may be conveyed under high pressure in a pipeline to a different location where the oil and gas are separated.

Sometimes the crude oil forms a stable foam as the gas separates with the result that liquid oil may be lost in the gas stream. To overcome this problem it has been proposed that an antifoam agent such as a polysiloxane should be added to the crude oil.

However, the proposed polysiloxanes are not always effective in preventing foaming and consequent significant loss of liquid with the gas.

Furthermore, certain foams termed micro gas dispersions are difficult to resolve by conventional anti-foam agents. A micro gas dispersion is a dispersion of a gas in a liquid in which the gas bubbles are generally less than 50 microns in size and can move essentially independently in the liquid. This is distinguished from other foams in which the gas bubbles are generally larger than 50 microns and are relatively immovable. The specific gravity of these other foams is nearer to that of the gas then is the case with a micro gas dispersion. Micro gas dispersions tend to be more stable and more difficult to break than other foams.

Micro gas dispersions are often produced from live crude oils from which methane has been at least partially removed.

Such crude oils may be received from offshore locations where the methane has been separated and employed to power offshore facilities and/or flared.

It is an object of the present invention to provide an improved anti-foam additive, and, in particular, an anti-foam additive which is capable of dealing with micro gas dispersions.

We have now discovered that certain polysiloxanes of specified molecular weight and molecular weight distribution fulfil this objective.

Molecular weights in the present application, unless specified otherwise, are polystyrene equivalent molecular weights as determined by gel permeation chromatography (GPC).

Thus according to the present invention there is provided a polysiloxane containing not more than 10% by weight of components of molecular weight 50,000 and lower, at least 15% by weight of components of molecular weight 200,000 and higher and not more than 6% by weight of components of molecular weight 370,000 and higher.

Desirably the polysiloxane contains less than 2.5% by weight of components of moleculr weight less than 30,000.

Preferably the polysiloxane contains not more than 2.8% by weight of components of molecular weight 7,100 or lower, not more than 28% by weight of components of molecular weight 83,000 or lower, not more than 14.5% by weight of components of molecular weight 305,000 and greater and not more than 0.03% by weight of components of molecular weight 1,750,000 and greater.

The polysiloxane may be characterised by the following parameters:
  (a) a number average molecular weight $M_n$ in the range 20,000 to 150,000
  (b) a weight average molecular weight $M_w$ in the range 100,000 to 300,000
  (c) a peak molecular weight $M_p$ in the range 100,000 to 220,000, and
  (d) a polydispersity $M_w/M_n$ of not more than 10.

The number average molecular weight $M_n$ in the component in the main peak of a gel permeation chromatograph of the polysiloxane is preferably in the range 70,000 to 150,000 and the peak molecular weight $M_p$ is preferably in the range 130,000 to 150,000.

The polydispersity should not be greater than 2.

Preferably the polysiloxane is a polydimethylsiloxane.

The content of $CH_3SiO_{1.5}$ groups should not be greater than 0.1 mole %, preferably not greater than 0.01 mole %.

Generally the polysiloxanes will have a viscosity of at least 500,000 centistokes at 25° C. Especially useful are polysiloxanes of viscosity of more than 1,000,000 centistokes at 25° C.

The term 'polysiloxane' is to be construed in such a way as to include the optional presence of up to 0.5% of propylene oxide and up to 0.1% of ethylene oxide, both % being by weight.

The polysiloxanes of the present invention can be produced by polymerisation of cyclic siloxanes such as octamethylcyclotetrasiloxane, using catalysts such as bases, eg, alkali metal hydroxides (literature: W Nole, "Chemie and Technologie der Silicone", Verlag Chemie 1968, Page 194 et seq) or by polycondensation of polydimethylsiloxanediols of lower molecular weight using a catalyst, e.g., phosphoro-nitryl chloride (literature: W Nole as above, Page 181). The low and excessively high molecular weight portions of the siloxanes can be removed by distillation and/or solvent extraction.

The preparation can alternatively involve fractionation of a conventional silicone oil, such as one of 60,000 centistokes, to remove the lower molecular weight fractions and those of excessive molecular weight and thereby concentrate the higher molecular weight fractions.

Low molecular weight fractions have a pro-foaming tendency. Fractions of excessive molecular weight are believed to impair effectiveness because of their reduced dispersibility.

The overall effect of the fractionation is therefore to increase the molecular weight of the silicone present in the largest amount and to reduce the polydispersity.

Very suitable polydimethyl siloxanes of this invention are as exemplified by the polydimethylsiloxane of Example 1 and 2 can be obtained from Th. Goldschmidt A.G. under the designation SK 3556. Such polydimethylsiloxane compositions are made at Th Goldschmidt A.G. pursuant to the direction and teachings provided by the application in accordance with the present invention.

The polysiloxane anti-foam agents are effective in both high pressure separators and low pressure separators used at terminals where live crude oil is received by means of a pipeline.

As previously mentioned, crude oil from offshore locations normally contains little or no methane and anti-foam agents according to the present invention are particularly suitable for treating such materials.

They may also be used, however, for treating crude oils from which methane has not been removed.

Thus according to another aspect of the present invention there is provided a method for the separation of crude oil containing associated gas into liquid oil and gas wherein the separation is carried out in the presence of an effective amount of a polysiloxane as hereinbefore described.

The polysiloxane is suitably dispersed in a liquid hydrocarbon medium, e.g., white spirit, prior to addition to the crude oil.

The polysiloxane is preferably employed in amount 0.1 to 10 ppm, expressed on the basis of active ingredient.

After treatment and following storage and/or transportation, the concentration of active ingredient in the stabilised oil may be somewhat less, e.g. 0.01 to 10 ppm, since some may be lost by adsorption on the walls of containers.

The invention is illustrated with reference to the following examples.

In the examples, molecular weights were determined by gel permeation chromatography using six Styragel columns covering the pore size range $10^6$, $10^5$, $10^4$, $10^3$, 500 and 100 Angstroms. The detector was a Waters Differential Refractometer R401. Toluene was employed as the solvent and a 500 $\mu$l sample (0.2% v/v solution with respect to polymer) was passed through the columns at a flow rate of 2 ml/minute.

Calibration of the GPC column system was effected using monodisperse polystyrene standards. Calculation of molecular weight data was based on the method of equivalent polystyrene molecular weight.

A data logger system was used in conjunction with a desk top computer to process molecular weight distribution data. Data points were collected at each ½ ml elution volume over the base line $V_e=36$ to 58 ml and molecular weights calculated for the whole distribution and the main peak only. Individual weight fractions at each sample volume and cumulative weight fractions were expressed as normalised data enabling a quantitative description of the molecular weight distribution to be made.

EXAMPLE 1

A live crude oil containing light end gases at 100 bar received at Sullom Voe Terminal via the Ninian Pipeline was treated by the addition of 5 ppm of a polydimethylsiloxane dispersion obtained from Th. Goldschmidt A.G. under the designation SK 3556 (1 ppm active ingredient) and passed to a high pressure separator and then to a low pressure separator. The polymer which had a viscosity of over 1,000,000 centistokes at 25° C. was dissolved in white spirit and added to the oil as a 20% dispersion in the white spirit. A micro gas dispersion formed in the separators but was almost entirely suppressed with the result that there was no significant loss of liquid oil.

The polydimethylsiloxane has molecular weight data obtained by gel permeation chromatography as follows:
$M_n=125,000$ (32,700); $M_w$ 211,000 (127,000); $M_w/M_n$ 1.69 (3.88); $M_p$ 143,000 (105,000)
% molecular weight less than 30,000 = 2.3% (13.0)
% molecular weight less than 44,000 = 6.2% (22.8)
% molecular weight greater than 230,000 = 20.2% (6.6)

The figures in brackets are for a conventional 60,000 centistoke polydimethylsiloxane oil.

Comparative Test A

To the same crude oil was added a silicone anti-foam agent of the type conventionally employed in oil/gas separation and containing 60,000 centistokes polydimethylsiloxane oil as a 40% solution in white spirit. A micro gas dispersion formed in the separators and the agent was ineffective in breaking the foam at 5 ppm dosage (2 ppm active ingredient). Despite increasing the dosage to 15 ppm (6 ppm active ingredient) and higher, it was ineffective in breaking the foam and in some cases, e.g. at 30 ppm (12 ppm active ingredient) foaming was increased.

Comparative Test B

To the same crude oil was added a fluorosilicone in an amount of 5 ppm (2 ppm active ingredient). The silicone was added as a 40% dispersion in cellosolve acetate. Foaming was not suppressed at this concentration nor at levels up to 100 ppm (40 ppm active ingredient), a micro gas dispersion again being formed which could not be broken.

These tests and example illustrate that the high molecular weight, high viscosity polydimethylsiloxanes of the present invention are more effective in treating crude oil where micro gas dispersions are formed.

EXAMPLE 2

Example 1 was repeated using a polydimethylsiloxane termed SK 3556 obtained from Th. Goldschmidt AG and having the following properties:
$M_n=114,000$; $M_w=193,000$; $M_w/M_n=1.7$; $M_p=144,000$
% molecular weight less than 7,100 = 0
% molecular weight less than 83,000 = 23.2
% molecular weight greater than 305,000 = 12.7
% molecular weight greater than 1,750,000 = 0

As before the polymer was dispersed in white spirit and added to the oil as a 20% dispersion to give a concentration of active ingredient of 1 ppm.

A micro gas dispersion formed in the separators but was almost entirely suppressed with the result that there was no significant loss of liquid oil.

Comparative Test C

Example 2 was repeated using a different polydimethylsiloxane obtained from Th. Goldschmidt AG having the following properties:
$M_n=30,300$; $M_w=380,000$; $M_w/M_n=12.6$; $M_p=117,000$
% molecular weight less than 7,100 = 4.1
% molecular weight less than 83,000 = 33.9
% molecular weight greater than 305,000 = 28.1
% molecular weight greater than 1,750,000 = 3.6

The polymer was ineffective in breaking the foam.

This example illustrates the importance of the absence of significant amounts of material of low and excessively high molecular weight and also the importance of a low dispersity.

We claim:

1. A polysiloxane characterized by the fact that it contains components of molecular weight in the range of 83,000 to 305,000 and containing not more than 2.8% by weight of components of molecular weight 7,100 or lower, not more than 28% by weight of components of molecular weight 83,000 or lower, not more than 14.5% by weight of components of molecular weight 305,000 or higher, and not more than 0.03% by weight of components of molecular weight 1,750,000 or higher, molecular weights being expressed as polystyrene equivalent molecular weights.

2. A polysiloxane according to claim 1 wherein the peak molecular weight $M_p$ is in the range 130,000 to 150,000.

3. A polysiloxane according to claim 1 wherein the polydispersity $M_w/M_n$ is not more than 2.

4. A polysiloxane according to claims 1, 2 or 3 wherein the polysiloxane is a polydimethylsiloxane.

* * * * *